United States Patent [19]

Pestka

[11] 3,916,755
[45] Nov. 4, 1975

[54] DRIVE FASTENER FOR INSERTION INTO SHEET MATERIAL

[75] Inventor: John A. Pestka, Parkridge, Ill.
[73] Assignee: Illinois Tool Works Inc., Chicago, Ill.
[22] Filed: Apr. 3, 1974
[21] Appl. No.: 457,428

[52] U.S. Cl. .................................. 85/5 R; 24/73 B
[51] Int. Cl.$^2$ ........................................ F16B 21/08
[58] Field of Search ....... 85/5 R, 8.3; 24/73 P, 73 B

[56] References Cited
UNITED STATES PATENTS

| | | | |
|---|---|---|---|
| 2,100,017 | 11/1937 | Van Uum | 85/5 R |
| 2,110,959 | 3/1938 | Lombard | 85/5 R |
| 2,137,210 | 11/1938 | Lombard | 85/5 R |
| 2,138,195 | 11/1938 | Place | 85/5 R |
| 2,380,104 | 7/1945 | Gebauer | 24/73 B |
| 2,538,827 | 1/1951 | Burns | 85/5 R |
| 2,551,970 | 5/1951 | Sampson | 24/73 B |
| 3,535,673 | 10/1970 | Maltais et al. | 24/73 B |

Primary Examiner—Edward C. Allen
Attorney, Agent, or Firm—Olson, Trexler, Wolters, Bushnell & Fosse, Ltd.

[57] ABSTRACT

The embodiment of the invention disclosed herein is directed to a drive fastener for insertion into sheet material. The drive fastener is formed of a sheet metal stamping having flat wall sections in opposing relation to one another and which are tied together at a nose end which is formed of a short length of the sheet metal. The side edges of the flat wall sections diverge from the nose end to a neck portion and one of the side edges of each flat wall section has a laterally projecting shoulder immediately beneath the neck portion. Above the neck portion is formed a longitudinally and laterally projecting head portion. Along the length of the flat wall sections, neck portions and head portions are formed rib sections which are C-shaped in the cross section. These rib sections allow temporary lateral compression of the flat wall section during insertion of the drive fastener through an opening formed in the sheet material so that upon complete insertion of the fastener the rib section resiliently urges the side edges of the flat wall section outwardly firmly to engage the inner periphery of the opening. The rib sections are dimensioned laterally also to engage the periphery of the opening so that a four point contact of the drive fastener is made with the periphery of the aperture.

2 Claims, 5 Drawing Figures

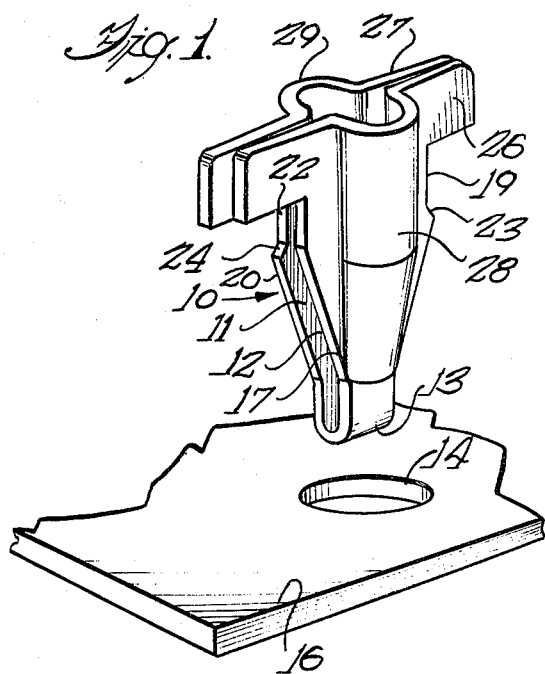
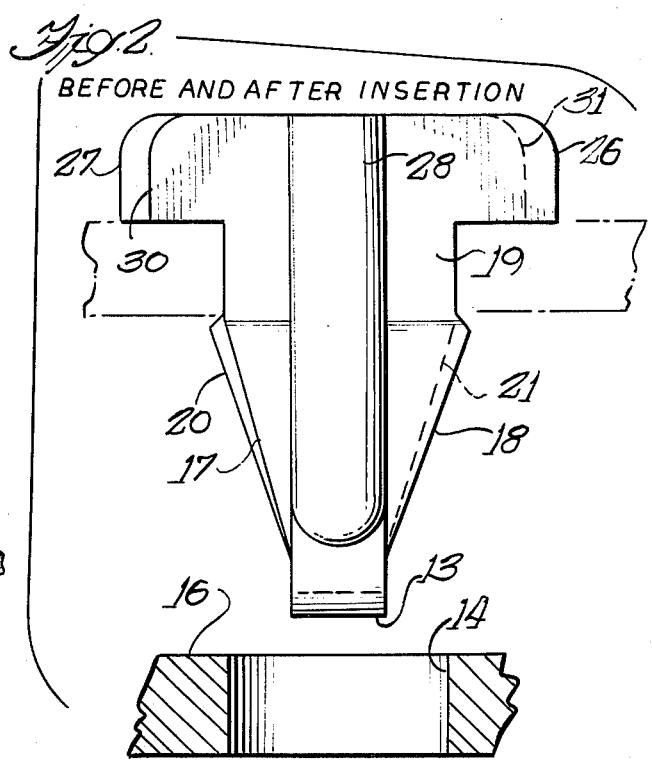
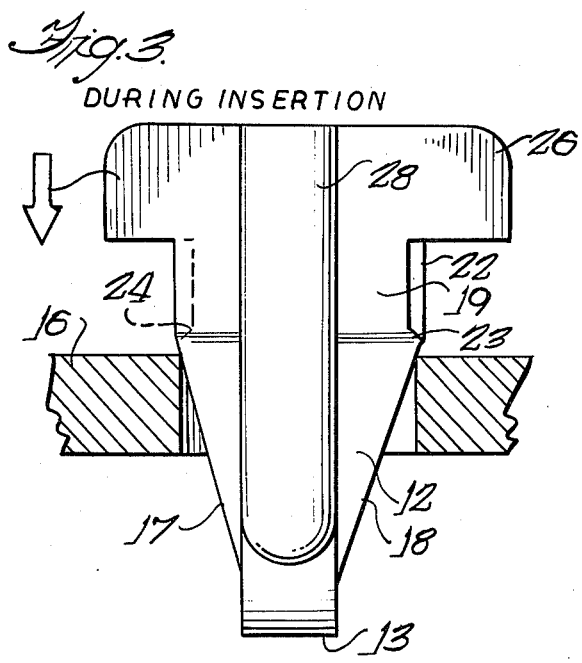
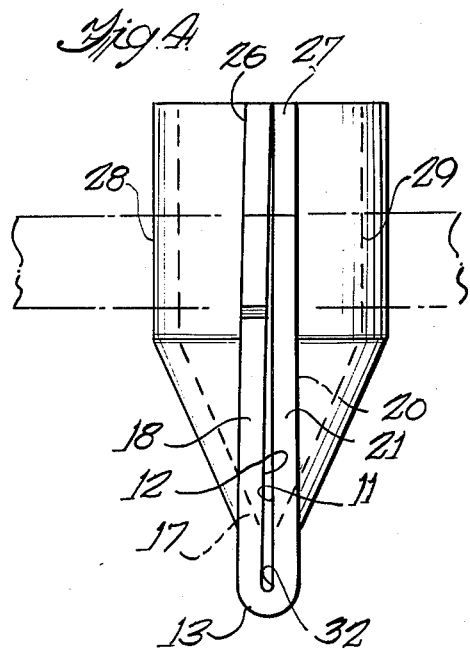
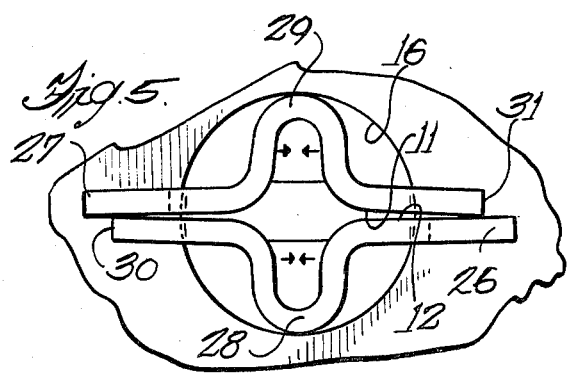

3,916,755

DRIVE FASTENER FOR INSERTION INTO SHEET MATERIAL

BACKGROUND OF THE INVENTION

This invention relates generally to improvements in the structure of fastener devices used primarily in the field of joining sheet material, and more particularly to a drive fastener and its combination of elements that provide substantial useful improvements over existing drive fasteners which are now commonly used in the field of joining sheet material. However, it will be understood that while this invention is directed particularly to drive fasteners used for joining sheet material, the specific device disclosed herein can be used in other allied fields such as providing shelf supports and hangers for sheet material, and the like.

Heretofore, drive fasteners used in the field of joining sheet material, and other allied fields, have been relatively limited in their ability to prevent lateral movement of the fastener in one or more directions. This is the result of prior art fasteners having only two engaging surface portions with the inner periphery of the aperture through which the fastener extends.

SUMMARY OF THE INVENTION

Accordingly, it is a primary object of this invention to provide a new and improved drive fastener which has more than two contact areas of the fastener within a circular aperture through which the fastener extends when inserted into sheet material.

Another object of this invention is to provide a new and improved drive fastener for sheet material which is relatively inexpensive and simple to manufacture while providing a high degree of reliability and efficiency in use.

Briefly, the drive fastener of this invention preferably is formed of a sheet metal stamping which has flat wall sections superimposed upon themselves by folding the stamping at a nose end which may be considered the inserting end of the fastener. The flat wall sections have diverging edges extending from the nose end to a neck portion which is of a dimension, in the neutral condition, slightly greater than the diameter of the aperture through which the fastener is to be inserted. A laterally projecting shoulder is formed at the upper end of one of the edges of each flat wall section. The lateral extending shoulder on each flat wall portion is opposite the lateral extending shoulder of the other. A longitudinally and laterally extending head portion is formed above the shoulder to overlie the sheet material through which the fastener is inserted. Formed along the flat wall sections, the neck portions and the head portions are U-shaped rib sections which provide a resilient character to the transverse compressibility of the fastener.

When the fastener is driven through the aperture formed in the sheet material, the transverse extent of the neck portion and side wall portions temporarily diminishes as the C-shaped rib collapses. Once the laterally disposed shoulder portion passes through the underside of the sheet material, the resilient characteristic of the material causes the neck portion and flat wall portions again to return substantially to their original configuration. This will insure substantial pressure of abutment between the edges of the neck portion and the inner periphery of the aperture. Also, the lateral extent of the C-shaped rib sections is such as to engage the inner periphery of the aperture thereby providing a four point contact arrangement in quadrataure. Pressure of the rib sections is provided by maintaining the flat wall sections closely spaced apart and engaging the sections only at the terminating edges of the head section so as to be resilient.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a drive fastener constructed in accordance with the principles of this invention and shown placed in registry with an aperture formed in sheet material through which the fastener is to be inserted;

FIG. 2 is an exploded view of the fastener and sheet material showing the condition of the fastener before and after insertion through the sheet material;

FIG. 3 is a diagrammatic representation of the fastener as it is passing through the opening of the sheet material showing the temporary collapse of the edges of the fastener;

FIG. 4 is a side view of the fastener of this invention showing the nose portion with the flat wall sections bent upon themselves; and FIG. 5 is a top view of the fastener showing the C-shaped configuration of the longitudinal ribs which provide resilient collapsing of the edges of the flat wall sections during insertion.

DETAILED DESCRIPTION OF THE ILLUSTRATED EMBODIMENT

Referring now to FIG. 1 there is seen a drive fastener constructed in accordance with the principles of this invention and designated generally by reference numeral 10. The drive fastener 10 is adapted for use with sheet material such as sheet metal or plastic or the like. Most advantageously, the drive fastener 10 is constructed from a sheet metal stamping which is bent to have a pair of spaced apart flat wall sections 11 and 12 substantially superimposed over one another but closely spaced apart so that a slight amount of compressibility of the fastener is obtained by urging the walls still closer together. The flat wall sections are folded upon themselves by a nose end portion 13 which is adapted readily to fit through an aperture 14 within sheet material 16 to receive the fastener. While only a single thickness of sheet material is illustrated on the drawings, it will be understood that the fastener is capable of use with sheet material of several thicknesses to hold the various thicknesses of sheet material firmly together.

The flat wall section 12 has edges 17 and 18 diverging from the nose end 13 toward a neck portion 19. Similarly, the flat wall section 11 has edges 20 and 21 diverging from the nose section 13 toward a correspondingly fashioned neck portion 22. In the illustrated embodiment, the longitudinal extent of the neck portions 19 and 22 is substantially the same as the thickness of the sheet material to receive the drive fastener.

Formed at the upper end of the edge 18 is a laterally projecting shoulder 23, and formed at the upper end of the edge 20 is a laterally projecting shoulder 24. The laterally projecting shoulders 23 and 24 are on opposite edges of the closely spaced apart flat wall sections. Therefore, the laterally projecting shoulder of one flat wall section is immediately adjacent a smooth diverging edge of the other flat wall section.

Extending longitudinally and laterally of the neck portions 19 and 22 are head portions 26 and 27, respectively, which overlie the peripheral portion of the aperture when the fastener is inserted therethrough. The flat wall sections 11 and 12 are provided with longitudinal resilient portions which enable the edges of each flat wall portion to be compressed inwardly during the insertion of the fastener through the aperture. The resilient member is obtained by a rib element 28 formed on the flat wall section 12 and a rib element 29 formed on the flat wall section 11. In the illustrated embodiment, the rib portions are substantially U-shaped in the cross section taken transversely of the longitudinal extent, as best seen in FIG. 5. Also as seen in FIG. 5, as indicated by the inwardly directed arrowed lines, is the relative compressibility of the rib section as the fastener is driven through the aperture 16.

To insure nonmovement of the fastener in the aperture in all lateral directions, the rib portions 28 and 29 are dimensioned to also engage the inner periphery of the aperture 16. This, therefore, provides point contact at four quadrants of the aperture.

Also seen in FIG. 5 is the relatively close spacing of the spaced apart wall sections 11 and 12. These wall sections are maintained apart as the result of the terminating edges 30 and 31 of the head portions 26 and 27, respectively, engaging the flat area portions of the head.

When the fastener 10 is inserted in sheet material, the laterally projecting shoulders 23 and 24 together with the head portions 26 and 27 are located on opposite sides of the sheet material, as best seen in FIGS. 2 and 4. Furthermore, it will be noted that the resilient characteristic of the rib portions 28 and 29 will cause the neck portions 19 and 22 to become out of registry with one another, as seen in FIG. 3, during the insertion operation. The nose end 13 has a space 32 which also maintains the flat wall sections 11 and 12 closely spaced apart from one another and provides contact of the two sections only at the edges 30 and 31 of the head portions.

While the drive fastener of the present invention is intended for use in conjunction with apertures which are slightly smaller than the lateral dimension of the neck portion, it will be understood that the fastener can be used with apertures having the exact same measurement or slightly larger if desired. Accordingly, variations and modifications of this invention may be effected without departing from the spirit and scope of the novel concepts disclosed and claimed herein.

The invention is claimed as follows:

, 1. A drive fastener for insertion into a sheet material workpiece having one or more apertures of a predetermined diameter, said fastener including first and second generally flat wall sections formed of a sheet metal stamping tied together at one end thereof to be bent upon itself to form a nose end for the drive fastener with said flat wall sections in adjacent opposing spaced relation to one another at said nose end and converging toward one another towards their opposite ends, each of said flat wall sections having the lateral edges thereof diverging from said nose end to a neck portion, a lateral projecting shoulder formed at an upper end of one of the lateral edges of each flat wall section, the transverse dimension measured from said shoulder to its opposite diverging edge being equal to or greater than said predetermined diameter, the lateral projecting shoulder of one flat wall section being on the opposite side as the lataeral projecting shoulder formed on the other flat wall section, each lateral peojecting shoulder and its associated diverging edges extend laterally beyond the adjacent diverging edge of the other flat wall section, a head portion extending longitudinally and laterally from each said neck portion to overlie the peripheral portion about said aperture, said head portions each including a pair of oppositely extending planar elements angularly disposed so that the terminating edges of said head portion are in contact with the terminating edges of the opposite head portions attached to the other neck portion, and resilient U-shaped rib means formed longitudinally along and in each of said flat wall sections, said neck portions, and said head portions, said U-shaped rib sections at their oppositely extending bight portions having a lateral extent equal to or greater than the predetermined diameter of the aperture and engaging said aperture at diametral points to assure positive contact, the sides of each of said U-shaped rib sections being movable toward one another to enable temporary laterally inward movement of said diverging edges, neck portions and head portions during insertion of said drive fastener into an aperture, and thereafter returning substantially to its original configuration with the lateral edges of said neck portion and the bight portion of the rib means engaging the inner periphery of the aperture in quadrature arrangement, said head and laterally projecting shoulder portions engaging the material immediately adjacent the aperture on opposite sides of the sheet material workpiece.

2. The drive fastener for insertion into sheet material as set forth in claim 1 wherein said nose end is formed of a reduced width portion having substantially parallel edges between the beginning of each of said diverging edges of each flat wall portion.

* * * * *